United States Patent
Coogan

(10) Patent No.: US 6,859,685 B2
(45) Date of Patent: Feb. 22, 2005

(54) CONTROLLER FOR DEVICES IN A CONTROL NETWORK

(75) Inventor: James J. Coogan, Des Plaines, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 42 days.

(21) Appl. No.: 09/990,465

(22) Filed: Nov. 21, 2001

(65) Prior Publication Data

US 2003/0097204 A1 May 22, 2003

(51) Int. Cl.⁷ .............................................. G01M 1/38
(52) U.S. Cl. .................................... 700/275; 700/276
(58) Field of Search ............................. 700/275–278; 710/14

(56) References Cited

U.S. PATENT DOCUMENTS

| | | | |
|---|---|---|---|
| 4,200,910 A | 4/1980 | Hall ............................. 700/16 |
| 4,373,351 A | 2/1983 | Stamp, Jr. et al. ............. 62/160 |
| 4,497,031 A | 1/1985 | Froehling et al. ........... 700/726 |
| 4,682,279 A * | 7/1987 | Watabe ......................... 700/12 |
| 4,829,447 A | 5/1989 | Parker et al. ................ 700/277 |
| 5,276,630 A | 1/1994 | Baldwin et al. ............. 700/726 |
| 5,786,993 A | 7/1998 | Frutiger et al. ................ 700/83 |
| 6,122,678 A | 9/2000 | Eckel et al. ................... 710/15 |
| 6,154,686 A | 11/2000 | Heffernen et al. .......... 700/276 |
| 6,219,590 B1 * | 4/2001 | Bernaden et al. ........... 700/277 |
| 6,388,399 B1 * | 5/2002 | Eckel et al. ................. 315/312 |
| 6,647,302 B2 | 11/2003 | Pouchak ....................... 700/83 |
| 2002/0152298 A1 | 10/2002 | Kikta et al. ................. 709/223 |

* cited by examiner

Primary Examiner—Jayprakash N. Gandhi
Assistant Examiner—Alexander Kosowski

(57) ABSTRACT

A device driver for a network device controller for selectively controlling an end device in a control network includes a first selector for selecting a plurality of first output signals from a plurality of first input signals, a second selector for selecting at least one second output signal from the first output signals, and a third selector for selecting an operating mode of the end device from a plurality of predefined operating modes based on the second output signal.

20 Claims, 7 Drawing Sheets

CONTROLLER FOR DEVICES IN A CONTROL NETWORK

BACKGROUND

The present invention generally relates to controllers for operatively controlling devices in a control network, and more particularly to an application specific controller having features for changing the operating mode of the device in the field.

Controllers for controlling specific applications of devices in a system built around a control network is well known in the art. A heating/ventilation/air conditioning (HVAC) system is one such control network system. These application specific controllers (ASCs) in a HVAC system, are typically employed as single room controllers in a building, and control up to about five or six HVAC devices. For example, an ASC might control a damper that allows outside air into a room, a valve that permits hot water to run through a coil to heat the air or a fan that pulls air from the room over the heating coil.

The ASCs are typically programmed at the factory during assembly in accordance with the design specification of the control network system in which the ASCs are intended to be implemented. Once the ASCs have been installed in the system, it is often very difficult and complicated to reprogram the ASCs in the field, should the need arise. For example, an ASC for a HVAC system may have been preprogrammed at the factory to allow the temperature of the room to be maintained at a higher predetermined temperature during the night than in the day. If, however, it is decided after the ASC has been installed in the HVAC system that the cooling should be completely disabled at night. It would be a complicated task for a technician to reconfigure the ASC to perform the new task.

SUMMARY OF THE INVENTION

The present invention relates to an application specific controller (ASC) having, in addition to the control functions preprogrammed at the factory, predefined selectable settings for controlling the operating modes of the building system components or HVAC devices that are operatively connected to the ASC. The present invention allows more flexibility in controlling these devices and significantly simplifies the time and effort required in reconfiguring the control functions of the controller.

DETAILED DESCRIPTION OF THE INVENTION

Broadly stated, the present invention is directed to a device driver for a network device controller for selectively controlling an end device in a control network. The device driver includes a first selector for selecting a plurality of first output signals from a plurality of first input signals, a second selector for selecting at least one second output signal from the first output signals, and a third selector for selecting an operating mode of the end device from a plurality of predefined operating modes based on the second output signal.

In accordance with a present invention, a controller for controlling a plurality of end devices in a control network includes a space controller for monitoring and receiving data from a space being maintained by the controller, at least one device driver in communication with the space controller and operatively connected to a corresponding one of the end devices for selecting an operating mode of the corresponding end device from a plurality of predefined operating modes, and a supervisory controller in communication with the space controller and the at least one device driver for supplying signals corresponding to the plurality of predefined operating modes to the device driver for selecting the operating mode of the corresponding end device. The device driver includes a first selector for selecting a plurality of first output signals from the signals corresponding to the plurality of predefined operating modes, a second selector for selecting a second output signal from the first output signals, and third selector for selecting the operating mode of the corresponding end device based on the second output signal.

In accordance with another aspect of the present invention, A device driver for a system controller having a plurality of pre-programmed system operating modes for controlling at least one device operatively connected to the system controller includes means for setting an operating mode of the device from a plurality of predetermined device operating modes, means for selecting the device operating mode in accordance the select system operating modes; and means for defining the select system operating modes based on user specified operating functions of the device.

Figure 1:
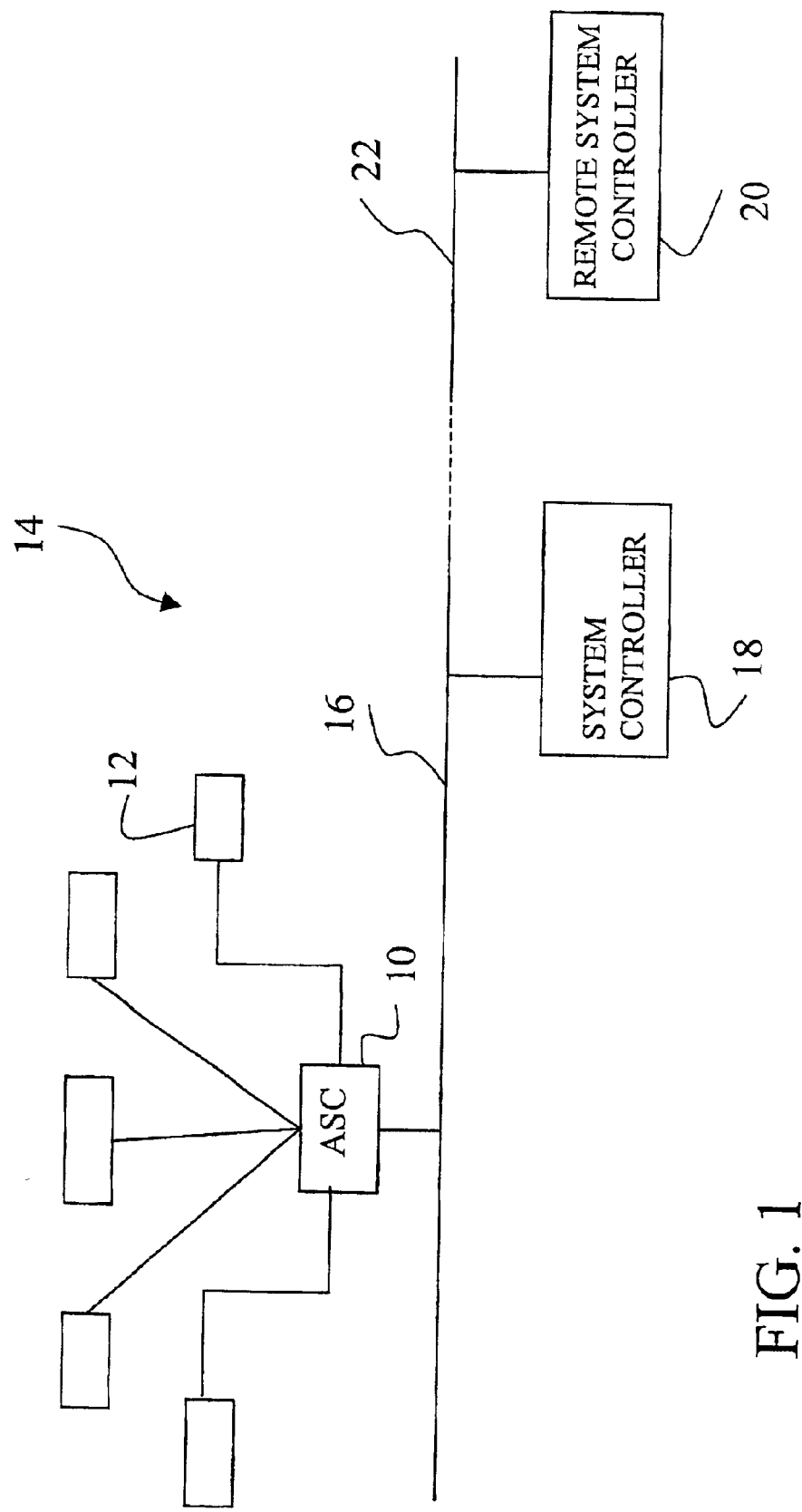
FIG. 1 is a block diagram of an application specific controller (ASC) embodying the present invention, shown connected to a control network and to the devices that the ASC controls.

Turning to FIG. 1, an application specific controller (ASC) in accordance with the present invention is generally designated at 10, and is operationally connected to a plurality of end devices 12 such as actuators, indicators, sensors, etc. in a heating/ventilation/air conditioning (HVAC) system 14. It should be understood that while the end devices 12 are shown connected directly to the ASC 10, they can be connected to the ASC via the network 16. The ASC 10 is connected to and in communication, via the control network, with a system controller 18 for sending commands and receiving reports from the ASC. Alternatively, or in addition to the system controller 18, the present invention includes a remote system controller 20 for controlling the ASC 10 via the internet 22, which is in communication with the control network 16.

Figure 2:
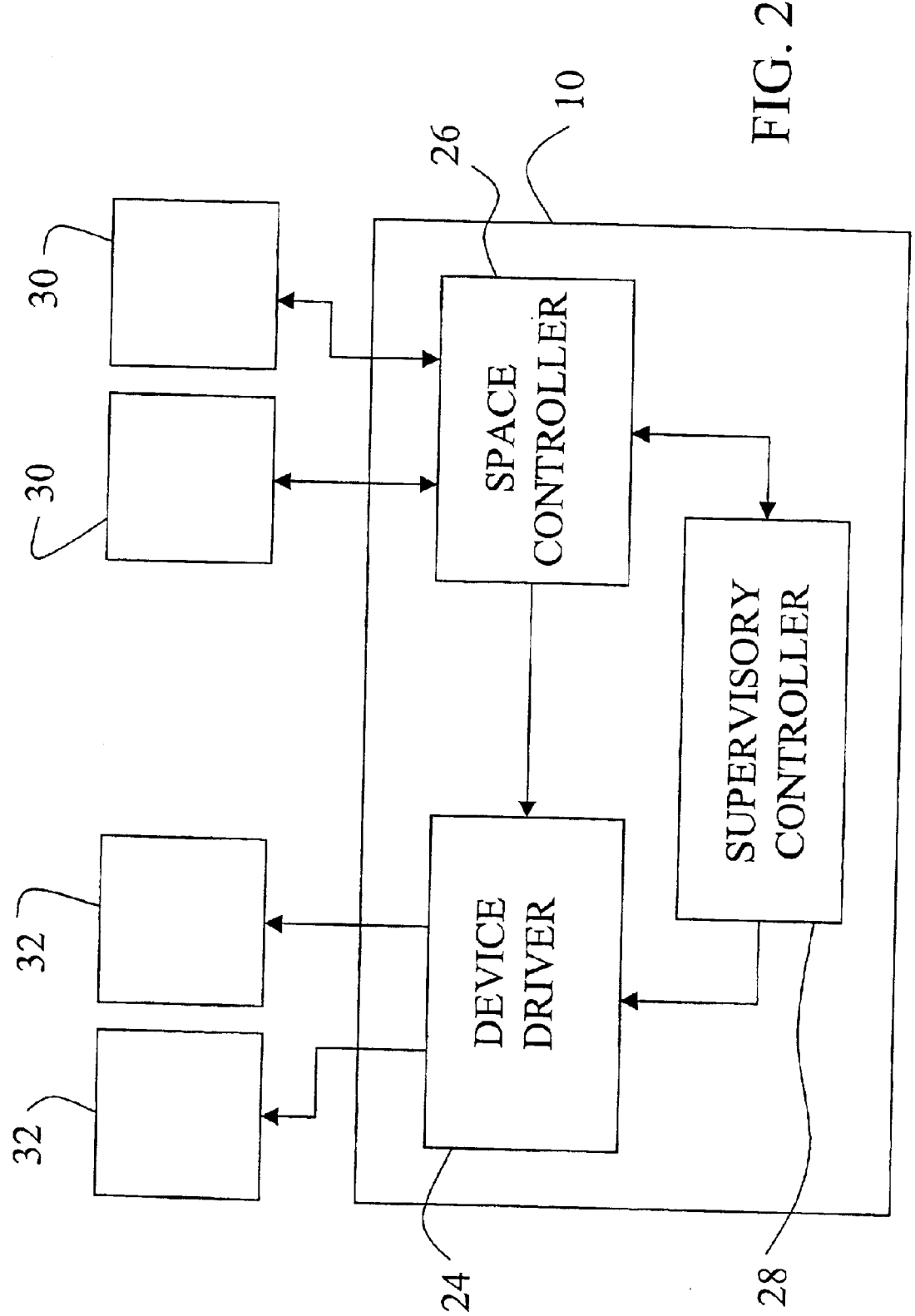
FIG. 2 is block diagram of the ASC of FIG. 1 shown connected to the HVAC devices.

Turning now to FIG. 2, the ASC 10 includes a device driver 24, a space controller 26 and a supervisory controller 28, and is shown operationally connected to the end devices 12 in the HAVC system 14. The end devices 12 are categorized into a plurality of space devices 30 and HVAC devices 32 (two each shown). The HVAC devices 32 include equipment such as, for example, a cooling coil for circulating chilled water, a heating coil for circulating hot water, and a fan for blowing air around the cooling or heating coils and into a space in which the temperature is controlled to maintain the space temperature at the desired setpoint. The space devices 30 includes equipment such as, for example, sensors for detecting the space temperature or the heating and cooling load on the space. The space devices 30 also include sensors for detecting whether or not the space is occupied by people.

The space controller 26 of the ASC 10 determines the temperature setpoints using local and network inputs, the heating and cooling load on the space, and the space occupancy based on the signals sent by the space sensors 30. The supervisory controller 28 sets the "system mode" of the ASC 10 for modifying the operation of the HVAC devices 32. In the preferred embodiment, the system mode includes an "occupancy mode" in which the ASC 10 is controlled in accordance with physical inputs from the space devices 30 and the network 16, and an "application mode" in which the ASC is controlled based on the local heating/cooling condition of the space and on commands from the network.

The device driver 24 responds primarily to the thermal load in the space and outputs a signal that sets the operating level of the HVAC devices 32. The device driver 24 modifies the operation of the HVAC devices 32 according to the occupancy mode and the application mode, i.e., the selected system mode set by the supervisory controller 28. In the preferred embodiment, these "device operating modes" include a MODULATED mode, a CYCLE or ON/OFF mode, an OFF mode and an ON mode. The MODULATED mode tracks the thermal load in the space as smoothly as possible so that the operating level of the HVAC devices 32 are adjusted precisely. For example, in a heating coil, the valve that controls the flow of hot water would be opened to any degree as specified by the device driver 24. The CYCLE mode tracks the load by turning the devices 32 fully ON or fully OFF, but does not offer the precise adjustments in between the two states as in the MODULATED mode. A device driver 24 set to a CYCLE mode would control the heating coil, by fully opening or fully closing the valve for controlling hot water flow. In the OFF mode the device would be set to OFF regardless of the load, and in the ON mode the device would be set to fully ON regardless of the load.

Figure 3:
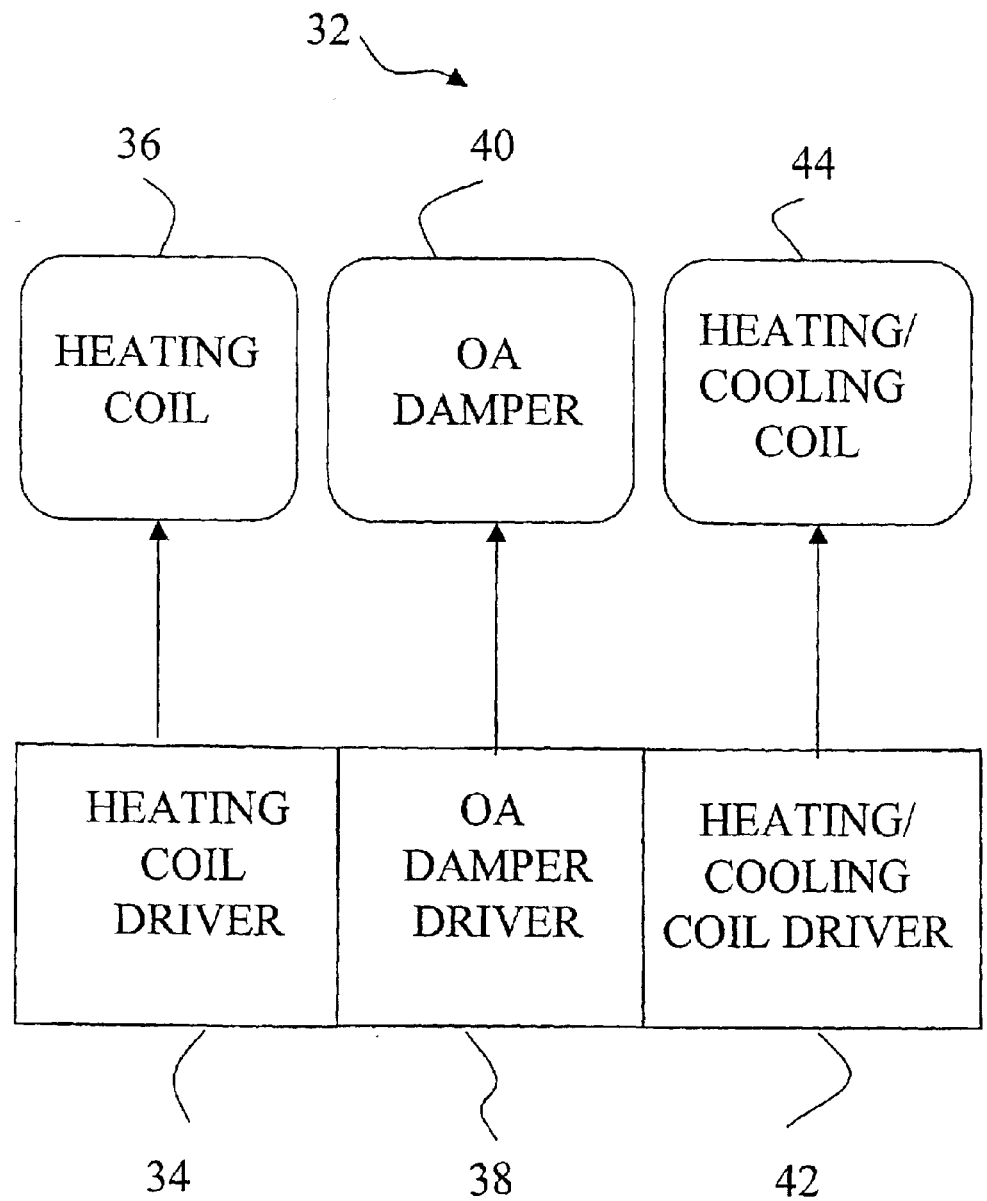
FIG. 3 is a block diagram of examples of different device drivers that are included in the ASC of FIG. 2 and their corresponding HVAC devices.

Turning now to FIG. 3, the device driver 24 is implemented preferably as software programs in a neuron processor, which is programmed in neuron C programming language, so as to be incorporated into a LON® control network. It should be understood, however, that other microprocessors programmed in different programming languages can also be employed, depending on the type of control network 16 used in the control system 14. A separate software program is provided for each of the HVAC devices 32 that are under the control of the device driver 24. In other words, the device driver 24 is comprised of separate software modules or separate clip equipment drivers, corresponding to the different HVAC devices 32. For example, a heating coil driver 34 would control the operation of a heating coil 36, an outside air damper driver 38, the operation of an outside air damper 40, and the fan driver 42 the fan 44.

Figure 4:
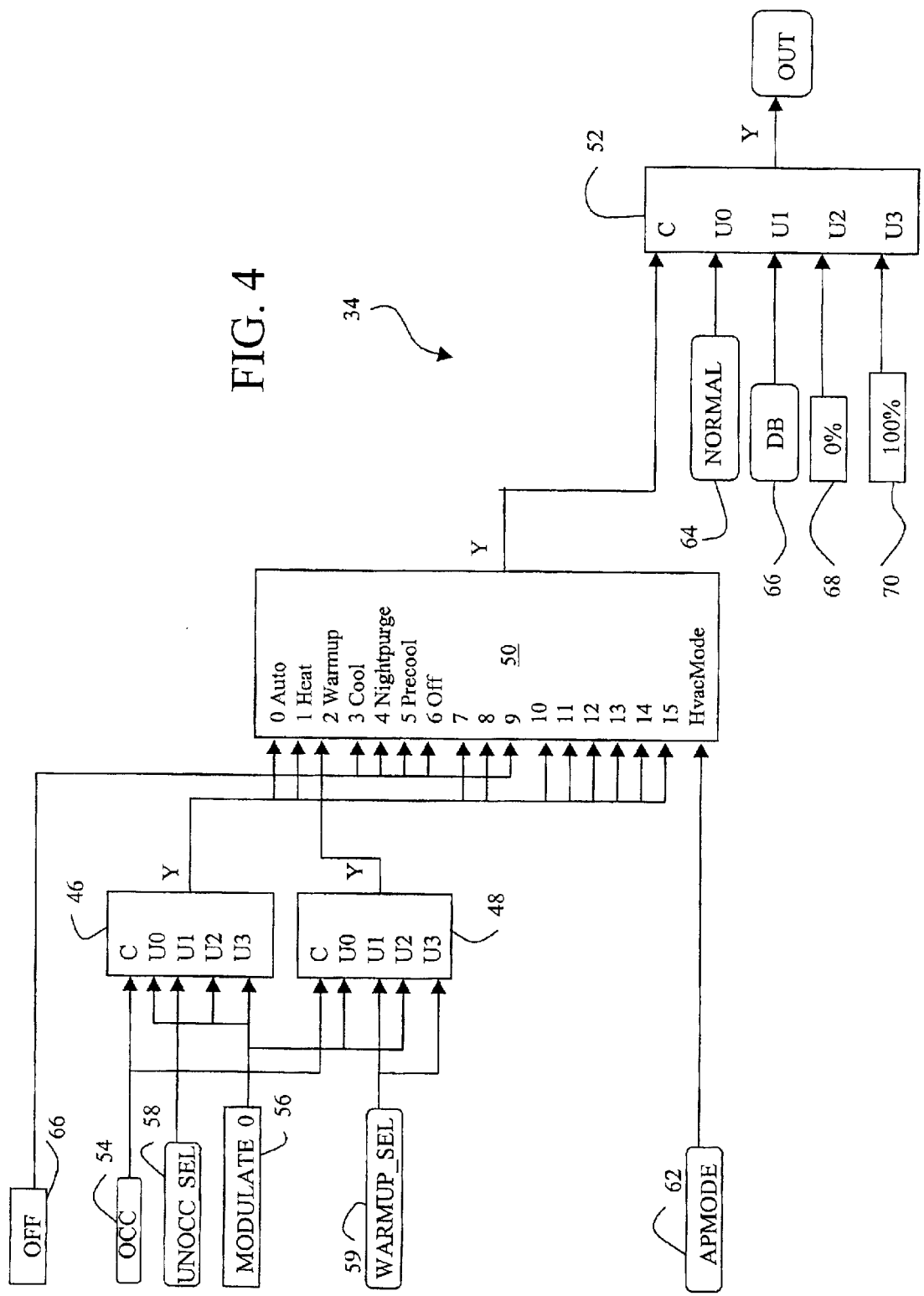
FIG. 4 is a block diagram of a heating coil driver.

Turning now to FIG. 4, the individual software modules or equipment drivers of the device driver 24 of the present invention is implemented, as an example, in the heating coil driver 34. The driver 34 includes a pair of input selectors 46, 48, an HVAC selector 50 and an output selector 52. Each of the input selectors 46, 48 includes four data inputs U0–U3, a data output Y and a data input select C for selecting one of the inputs U0–U3 to be output through the output Y. An occupancy (OCC) input 54 is commonly tied to the input select C of both input selector 46, 48. The value entered through the OCC input 54 may be one of 0–3, corresponding to inputs U0–U3 of the input selectors, respectively. The inputs U0, U2, U3 of the selector 46 receive data from a MODULATE state 56 for providing a constant value that enables the heating coil driver 34 to modulate the valve in the heating coil to track the setpoint temperature. The MODULATE state 56 is also connected to the inputs U0, and U2 of the selector 48. The remaining input U1 of the selector 46 is connected to an unoccupied select (UNOCC_SEL) input 58, and the inputs U1 and U3 of the selector 48 are connected to a WARMUP_SEL input 59.

The input selectors 46, 48 are arranged such that they output a signal representing various desired functions based on whether the occupancy mode of the ASC 10 is set to OCCUPIED or UNOCCUPIED. The selectors 46, 48 are configured such that in the OCCUPIED mode, i.e., when the signal input at the input select C is "0", the outputs Y of the selectors 46, 48 is the value that is provided at the input U0. In the heating coil driver 34, that value is a constant "0", which correspond to the MODULATE device operating mode. When the input U1 is selected through the input select C, the system mode is set to the UNOCCUPIED mode, and the selector 46 outputs the value from the UNOCC_SEL input 58 that is input at the input U1. The value may be one of 0, 1, 2 or 3 corresponding to the MODULATE, CYCLE, OFF, ON operating modes, respectively. The operating mode is selected by the particular requirements of the user during the UNOCCUPIED mode. The selector 48 also outputs the value from the WARMUP_SEL input 59 at its input U1 in the UNOCCUPIED mode. The WARMUP_SEL input 59 might be for a period between the UNOCCUPIED mode in which the space is maintained at a relatively low temperature and the OCCUPIED mode in which the space is maintained at a higher temperature. As in the selector 46, the value at the input U1 may be one of 0, 1, 2 or 3 corresponding to the MODULATE, CYCLE, ON, OFF modes, respectively.

In the preferred embodiment, the values of 2 and 3 at the input select C places the system modes into BYPASS and STANDBY modes. The STANDBY mode is for times when people are not present, but may be expected any time, such as an empty conference room, surrounded by occupied offices. The BYPASS mode is for times when people are not scheduled to be present, but they have pushed a button to indicate their unscheduled presence. The operating mode of the device 36 during BYPASS and STANDBY depends on the requirements of the user. In the example shown in FIG. 4, the operating mode is MODULATE during BYPASS and may be any of MODULATE, CYCLE, ON, OFF in the STANDBY mode.

The outputs of the two input selectors 46, 48, as determined by the value at the input select C, are sent to at least one of the plurality of predefined inputs of the HVAC selector 50 (inputs 0–15 shown in FIG. 4). Also input to the HVAC selector 50 is an OFF program 60 that generates a constant value of "2" for setting the heating coil device 34 in the OFF mode. The inputs to the HVAC selector 50 represent the predefined operating function of the ASC10, for example, Auto, Heat, Warmup, Cool, etc.

An output Y of the HVAC selector 50 is determined by an application mode APMODE input 62, which inputs a value into an HVACMODE input of the HVAC selector 50 to pick from the different predefined ASC 10 applications input is then output by the HVAC selector. It should be noted that not all inputs 0–15 have an associated predefined application, i.e., inputs 7–15. The output Y of the HVAC selector 50 is then transmitted to the output selector 52 at the input selector C, which determines one of the four inputs U0–U3 to be output by the output selector Y of the output selector.

The inputs U0–U3 of the output selector 52 includes a NORMAL signal 64 which is a feedback signal for determining the position of the valve in the heating coil 36 based on the temperature of the space being heated by the heating coil. In other words, the NORMAL signal sets the heating coil driver 34 in the MODULATED mode. A deadband (DB) signal 66 is also a feedback signal based on the space temperature for controlling the position of the heating coil valve. However, unlike the NORMAL signal 64 which provides a precise control for positioning the heating coil valve 34 at any open positions from 0% to 100%, the DB signal 66 sets the valve at either 0% open position or at 100% open position, i.e., the valve is cycled between the open and closed positions. As shown in FIG. 4, the NORMAL signal 64 is supplied to an input U0 and the DB signal 66 to a U1. An input U2 receives its signal from a signal generating program 68 that supplies a constant value for setting the heating coil valve 36 to a 0% open position, and an input U3 receives its signal from a signal generating program 70 that supplies a constant value for setting the valve to a 100% open position. The output Y of the output selector 52, as determined by the value (0–3) from the HVAC selector 50, supplies the signal for setting the operating mode of the HVAC device, i.e., the MODULATED, CYCLE, ON and OFF modes.

In operation, the operating mode of the heating coil 36 is reconfigured by inputting a value 0–3 at the OCC input 54. Based on this value, the input selector 46 outputs either a value (0–3) corresponding to the UNOCC signal or a constant "0" corresponding to the signal from the MODULATE state 56. The input selector 48 outputs a constant "0" corresponding to the signal from the MODULATE state 56 when the value at the OCC input 54 is 0 or 2, and one of the values 0–3 corresponding to the value at the WARMUP_SEL input 59 when the value at the OCC input is 1 or 3.

Accordingly, the outputs Y of the selectors 46,48 have values 0–3 and are input to the predetermined inputs 0–15 of the HVAC selector 50. The APMODE input 62 then determines the value to be supplied to the output selector 52 from the inputs 0–15. The output Y value of the HVAC selector 50 is one of 0–3 received from the input selectors 46, 48. Based on this value, the output selector 52 outputs a signal to the heating coil 36 corresponding to the one of the four device operating modes, i.e., MODULATED, CYCLE, OFF and ON.

Figure 5:
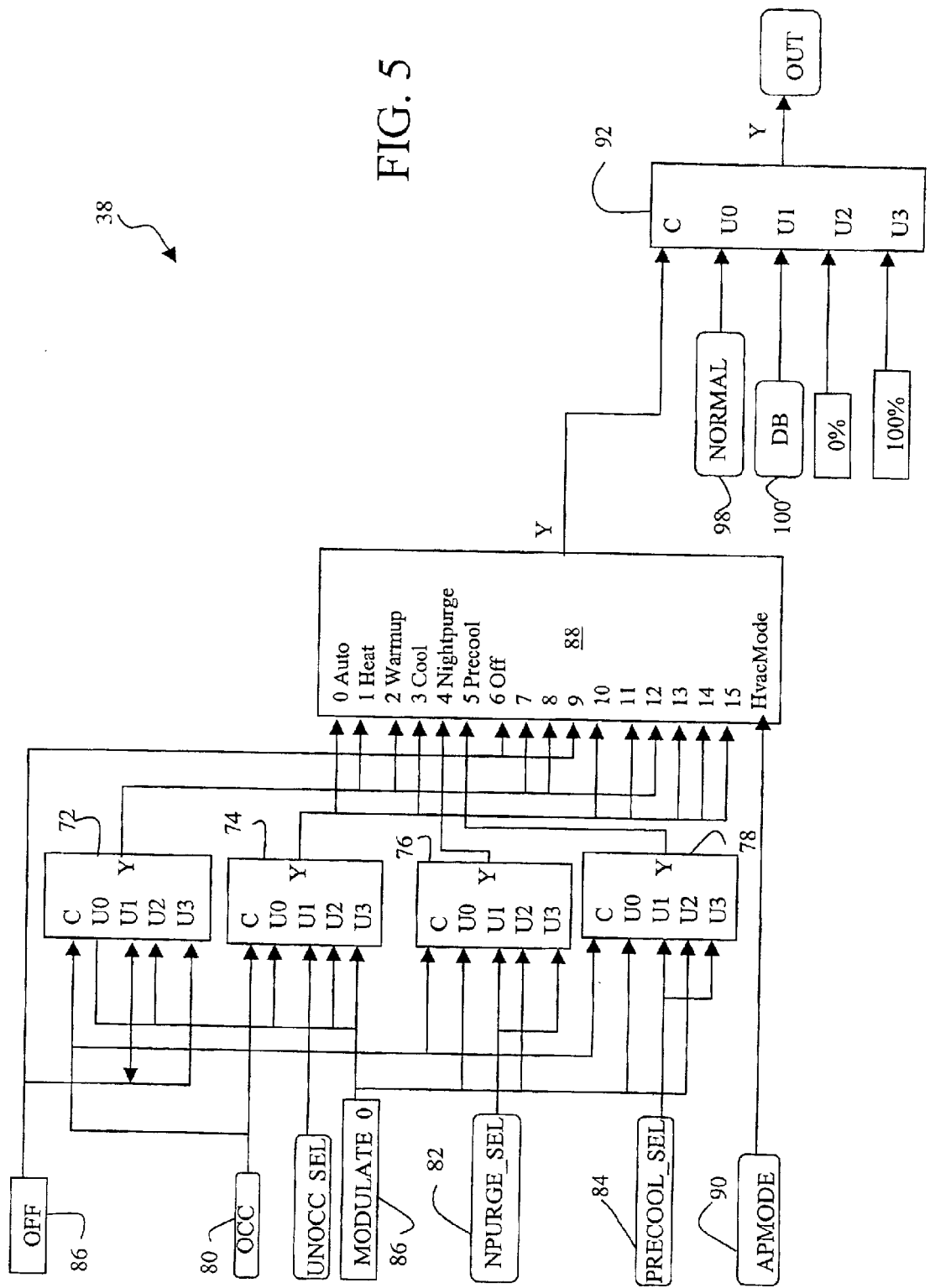
FIG. 5 is a block diagram of a OA damper driver.

Turning now to FIG. 5, it should be understood that the number of input selectors required to set the operating modes of the HVAC devices 32 depends on the intended use of the device. For example, the outside air (OA) damper driver 38 includes four input selectors 72, 74, 76, 78. The OA damper 40 (shown in FIG. 3) in the HVAC system 14 opens and closes to adjust the amount of outside air that is allowed into an inside space. The four-selector arrangement allows the OA damper driver 38 to perform a "night purge" and a "precool" function that might be desirable during the UNOCCUPIED system mode, i.e., when the input select C is provided with a value of "1" from an OCC input 80. The "night purge" function enables the HVAC system 14 to cool the space at night using only the outside air, and the "precool" function similarly allows the system to cool the space using the outside air in the period before the system mode is set to the OCCUPIED mode. The value at a NPURGE_SEL input 82 for performing the night purge function and at a PRECOOL_SEL input 84 for performing the precool function can be any of 0–3, corresponding respectively to the device operation modes of MODULATE, CYCLE, OFF and ON, as set by the user. Thus, when these functions are selected during the UNOCCUPIED MODE, the OA damper 40 operates in accordance with the value (0–3) at the NPURGE_SEL input 82 or the PRECOOL_SEL input 84.

As in the operation of the heating coil driver 34, the outputs of the input selectors 72, 74, 76, 78 are determined by the value at the input select C input via an OCC input 80. For example, if the value sent to the input select C is "0", the output of all the input selectors 72, 74, 76, 78 will be "0", since a MODULATE state 85 generates a constant "0". The value of "0" also sets the system mode to OCCUPIED. A "1" at the input select C sets the system mode to UNOCCUPIED, and the outputs at the input selectors 72, 74, 76, 78 are those values input at U1 of their respective selectors. A "2" or a "3" at the input select C sets the system mode to BYPASS or STANDBY as discussed above.

In the OA damper driver 38, an OFF program 86 for generating a constant "2" for setting the mode operation to OFF is connected to the input selector 72 and directly to an HVAC selector 88, so that the signal from the OFF program can be controlled based on the OCCUPANCY mode and the APPLICATION mode, or on APPLICATION mode alone.

The values output from the input selectors 72, 74, 76, 78 are input to the HVAC selector 88. An APMODE input 90 selects the output Y which is supplied to the output selector 92 for choosing one of the four inputs (a NORMAL signal 94, a deadband (DB) signal 96, and constant generating programs 68, 70 for outputting a "2" or a "3") for the output Y to be sent to the OA damper 40. Based on the value from the output Y, the operating mode of the OA damper 40 is set to NORMAL, CYCLE, OFF or ON.

Figure 6:
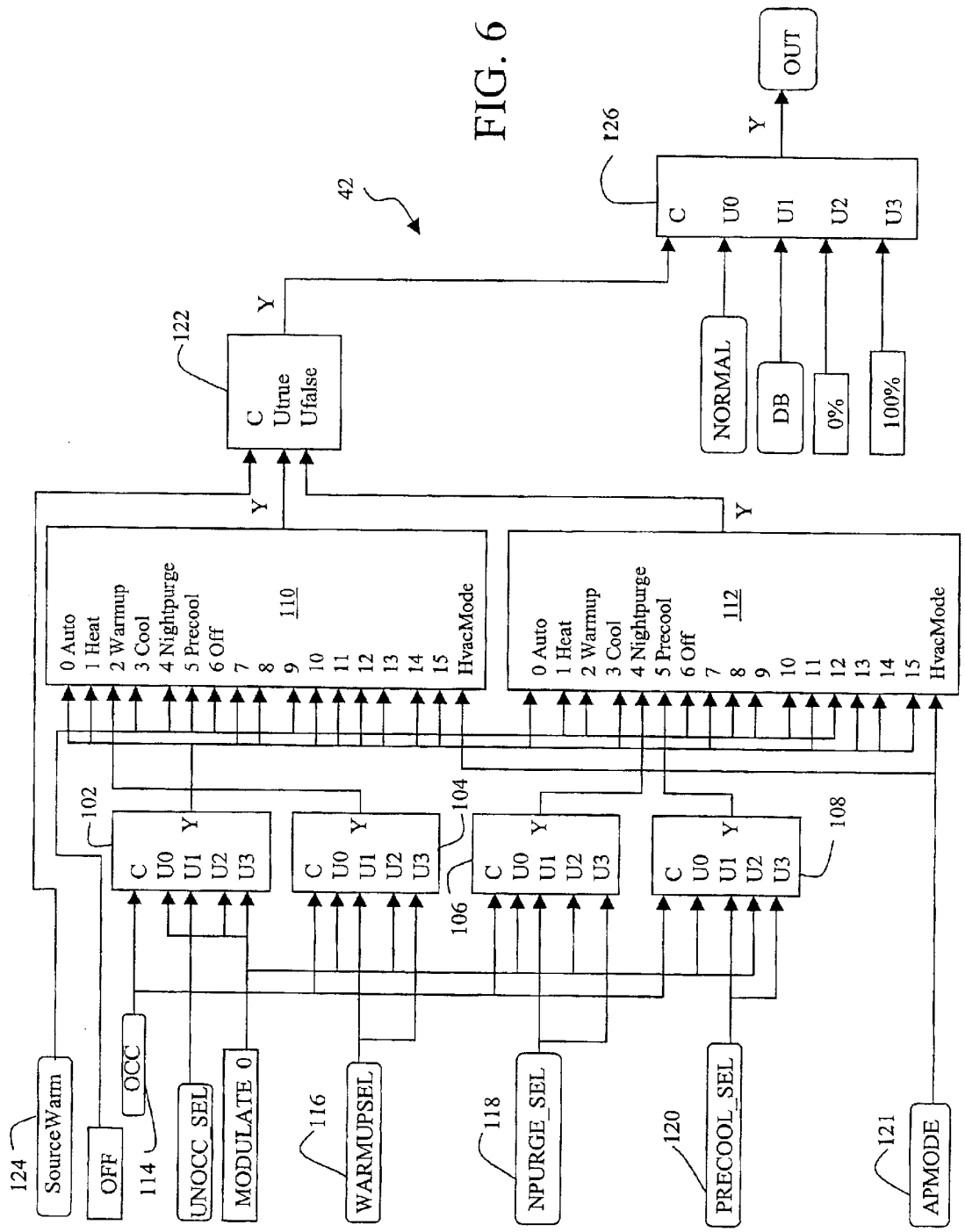
FIG. 6 is a block diagram of a heating/cooling coil driver.

Turning now to FIG. 6, the heating/cooling coil driver 42 (shown in FIG. 3) controls the operation of a coil that is used alternately for hot and cool water. The heating/cooling coil driver 42 includes four input selectors 102, 104, 106, 108 and two HVAC selectors 110,112. As in the heating coil driver 34 and the OA damper 38, the output Y of each of the input selectors 102, 104, 106, 108 is determined by the value at an OCC input 114. The HVAC selector 110 is adapted to be used for a heating function and the HVAC selector 112 for cooling. As such, the output Y of the input selector 104 that accepts signals from the WARMUP_SEL input 116 is connected to the HVAC 110, and the output Y of the input selectors 106, 108 are sent to the HVAC selector 112, since the NPURGE_SEL input and PRECOOL_SEL input control the cooling function of the heat/cooling coil 44. The output Y of the selector 102 is supplied to both HVAC selectors 110, 112, since the UNOCCUPIED system mode affects both HAVC selectors 110, 112.

The output Y of both HVAC selectors 110, 112, as selected by an APMODE input 121 for setting the application mode of the system are connected to a switch 122, which selects one of the two outputs in accordance with a signal from a SOURCEWARM input 124 that determines whether the coil 44 is operating as a heating coil or a cooling coil. The output Y from the switch 122 is sent to an output selector 126 for selecting one of the four inputs (NORMAL, DB, 0% and 100%) for setting the operating mode of the heating/cooling coil.

Figure 7:
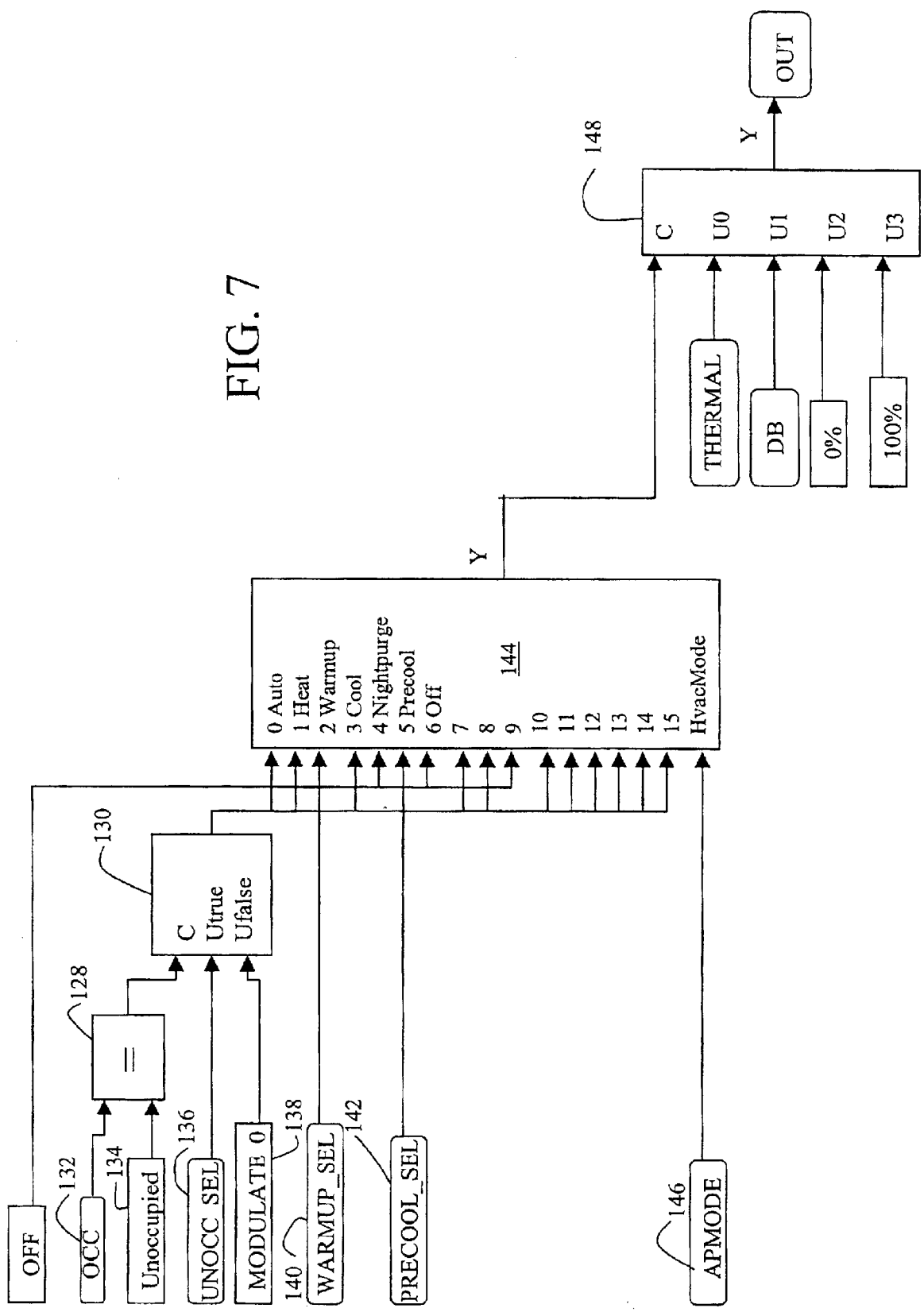
FIG. 7 is a block diagram of an alternate embodiment for selecting an occupancy mode of a device driver.

Turning now to FIG. 7, and in accordance with another aspect of the present invention, the occupancy mode of the device driver 24 is selected by an equal block 128 and a switch 130. The equal block 128 receives its input from an OCC input 132 and an UNOCCUPIED program 134 for generating a constant value representing the unoccupied mode. When the value input from the OCC input 132 is equal to the constant value from the UNOCCUPIED program 134, the switch 130 outputs the value input from the UNOCC_SEL input 136. Otherwise, the output Y of the switch 130 is the value ("0") from a MODULATE state 138 for setting the system mode to OCCUPIED ago and setting the device operating mode to MODULATE. In this embodiment, the device function inputs, a WARMUP_SEL 140 and a PRECOOL_SEL 142, for example, are input directly to the HVAC selector 144, independently of the occupancy mode of the system. However, once at the HVAC selector 144, they are subject to selection by the value input at the APMODE input 146 as described in the examples above. The function of an output selector 148 is also the same as the other output selectors 52, 92, 126 described above.

From the foregoing description, it should be understood that an improved HVAC device controller has been shown and described which has many desirable attributes and advantages. The device controller includes selectable system modes for placing the HVAC devices in different operating modes without complex and time-consuming reconfiguration. The operating modes of the HVAC devices are selected based on the application and occupancy modes of the system, the selection variables of which are programmed into the processor of the device controller by the installer.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. Various features of the invention are set forth in the appended claims.

What is claimed is:

1. A network device controller comprising:
   a device driver for selectively controlling an end device in a control network, wherein said driver comprises:
   a plurality of input selectors for selecting a plurality of first output signals from a plurality of first input signals;
   at least one intermediate selector for selecting at least one second output signal from said first output signals; and
   an output selector for selecting an operating mode of the end device from a plurality of predefined operating modes base based on said second output signal.

2. The device driver as defined in claim 1 wherein said output of each of said input selectors are connected to said plurality of inputs of said at least one intermediate selector, and said output of said at least one intermediate selector is connected to said output selector for selecting said operating mode.

3. The device driver as defined in claim 2 wherein said output of said at least one intermediate selector is input to a switch and an output of said switch is connected to said output selector for selecting the operating mode, when there are more than one said at least one intermediate selector.

4. The device driver as defined in claim 1 wherein said plurality of predefined operating modes include a first operating mode in which the end device is operated at any point from a first mode to a second mode.

5. The device driver as defined in claim 4 wherein said plurality of predefined operating modes include a second operating mode in which the end device is operated at said first mode or said second mode.

6. The device driver as defined in claim 5 wherein said plurality of predefined operating modes include a third operating mode in which the end device is operated at said first mode.

7. The device driver as defined in claim 6 said plurality of predefined operating modes include a third operating mode in which the end device is operated at said second mode.

8. The device driver as defined in claim 1 wherein said plurality of input selectors are connected to a first common input select signal for selecting said first output signals, and said at least one intermediate selector is connected to a second common input select signal for selecting said second output signal.

9. The device driver as defined in claim 1 wherein each of said plurality of first input signals corresponds to one of said predefined operating modes.

10. The device driver as claimed in claim 1, wherein said device driver is comprised of separate software modules corresponding to different devices.

11. The device driver as claimed in claim 1, wherein said device driver is incorporated in a LON control network.

12. A method of selectively controlling a end device in a control network, said method comprising the steps of:
    selecting a plurality of first output signals from a plurality of first input signals using a device driver provided in a controller;
    selecting a second output signal from said plurality of first output signals using said device driver; and
    selecting an operating mode of the end device from a plurality of predefined operating modes based on said second output signal using said device driver.

13. The method as defined in claim 12 wherein said plurality of predefined operating modes include a first operating mode in which the end device is operated at any point from a first mode to a second mode.

14. The method as defined in claim 13 wherein said plurality of predefined operating modes include a second operating mode in which the end device is operated at said first mode or said second mode.

15. The method as defined in claim 14 wherein said plurality of predefined operating modes include a third operating mode in which the end device is operated at said first mode.

16. The method as defined in claim 15 wherein said plurality of predefined operating modes include a third operating mode in which the end device is operated at said second mode.

17. A network device controller for selectively controlling a plurality of devices in a control network, said controller comprising:
    a plurality of device drivers for controlling a plurality of devices in said control network, wherein each said driver comprises:
    one or more selectors for selecting a plurality of first output signals from a plurality of first input signals;
    one or more selectors for selecting at least one second output signal from said first output signals; and
    one or more selectors for selecting an operating mode of the end device from a plurality of predefined operating modes base based on said second output signal.

18. A device driver as defined in claim 17 wherein said plurality of predefined operating modes include a first operating mode in which the end device is operated at any point from a first mode to a second mode.

19. A device driver as defined in claim 18 wherein said plurality of predefined operating modes include a second operating mode in which the end device is operated at said first mode or said second mode.

20. A device driver as defined in claim 19 wherein said plurality of predefined operating modes include a third operating mode in which the end device is operated at said first mode.

* * * * *